April 7, 1959 — W. C. FOSTER — 2,880,701
CAT AND DOG COLLAR
Filed Jan. 14, 1958

INVENTOR

William C. Foster 2,880,701

CAT AND DOG COLLAR

William C. Foster, San Francisco, Calif.

Application January 14, 1958, Serial No. 708,822

3 Claims. (Cl. 119—106)

This invention relates to domesticated animals and more particularly to a collar therefor.

It is an object of the present invention to provide a safety and identification collar for small animals, such as cats and small breed dogs that will enable the animal to escape in case the collar becomes snagged or caught on any stationary object.

Another object of the present invention is to provide a safety collar of the above type having self-containing identification tag means and which can be selectively made larger and smaller to fit any particular small animal.

Other objects of the invention are to provide an animal collar bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
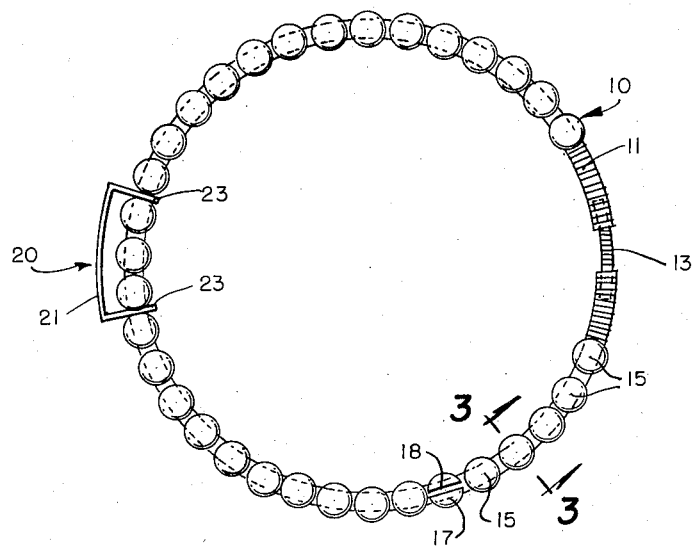
Figure 1 is a plan view of a safety collar made in accordance with the present invention.
Figure 2:
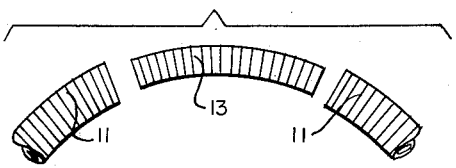
Figure 2 is an enlarged fragmentary exploded view of certain parts of the device shown in Figure 1.
Figure 3:
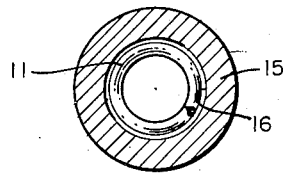
Figure 3 is an enlarged transverse cross sectional view taken along line 3—3 of Figure 1.

Referring now more in detail to the drawing, a collar 10 made in accordance with the present invention is shown to include an annular ring that is formed by an elongated tension spring 11 and a shorter tension spring 13 of slightly smaller diameter. The shorter spring 13 is used to connect the opposite ends of the elongated spring together, as shown in Figures 1 and 2, such that each end of the shorter spring 13 is received within an opposite one of the ends of the elongated spring 11. This ring slidably supports a plurality of multi-colored beads 15 which have transverse bores 16 of slightly larger diameter than the diameter of the larger elongated spring 11. Additional adapter beads 17 having longitudinal slits 18 which enable them to be placed upon or removed from the ring, provide means for increasing or decreasing the size of the collar so as to fit any particular animal.

Figure 4:
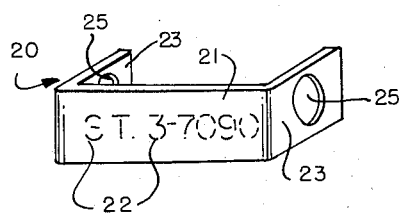
Figure 4 is an enlarged perspective view of an identification tag forming a part of the present invention.

With further reference now to Figure 4 of the drawing, an identification tag 20 forming a part of the present invention is shown to include an arcuate plate 21 having a face upon which various types of identifying indicia 22 may be impressed, such as the telephone number of the owner, so as to enable the owner to be located in case the animal becomes lost. This plate 21 has a pair of outwardly converging legs 23 at its ends, each such leg 23 having a bore 25 for slidably receiving the ring. In actual use, the plate 21 spans two or three of the beads 15, as shown in Figure 1, and is normally directed toward the outer periphery of the collar by the particular size and shape of the respective parts, thus adding to the comfort of the animal. In the event that the collar becomes caught upon any stationary object while it is upon the neck of an animal, it becomes a natural and simple act for the animal to withdraw its head through the yieldable ring.

While various changes may be made in the detail construction, it shall be understood that such changes shall be within the spirit and scope of the present invention as defined by the appended claims.

What I claim as new and desire to protect by Letters Patent of the United States is:

1. A cat and dog identification band comprising, in combination, a yieldable annular ring, a plurality of beads slidably supported upon said ring, a tag slidably supported upon said ring in overlying relationship with a plurality of said beads, said tag having identification means for locating the owner of the animal wearing said band, said annular ring comprising an elongated tension spring and a shorter tension spring, said elongated tension spring being of larger diameter than said shorter tension spring, and said shorter tension spring connecting the ends of said elongated spring together to form said ring, and each end of said shorter tension spring being engaged within one of the ends of said elongated spring.

2. The combination according to claim 1, wherein said tag comprises an arcuate plate having a plurality of outwardly converging legs one at each end.

3. The combination according to claim 2, wherein each of said legs includes a central opening for slidably receiving said ring therethrough.

References Cited in the file of this patent

UNITED STATES PATENTS

| | | |
|---|---|---|
| 883,611 | Barad et al. | Mar. 31, 1908 |
| 2,097,070 | Lago | Oct. 26, 1937 |
| 2,453,010 | Graffin | Nov. 2, 1948 |
| 2,833,249 | Cornman | May 6, 1958 |

FOREIGN PATENTS

| | | |
|---|---|---|
| 976,283 | France | Oct. 25, 1950 |